(12) United States Patent
Takada

(10) Patent No.: US 11,249,414 B1
(45) Date of Patent: Feb. 15, 2022

(54) DRIVING APPARATUS AND IMAGE FORMING APPARATUS

(71) Applicant: TOSHIBA TEC KABUSHIKI KAISHA, Tokyo (JP)

(72) Inventor: Kazumasa Takada, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/024,970

(22) Filed: Sep. 18, 2020

(51) Int. Cl.
*G03G 15/043* (2006.01)
*G06K 15/14* (2006.01)
*G06K 15/16* (2006.01)

(52) U.S. Cl.
CPC .......... *G03G 15/043* (2013.01); *G06K 15/14* (2013.01); *G06K 15/16* (2013.01)

(58) Field of Classification Search
CPC ....... G03G 15/04054; G03G 15/04063; G03G 15/04072; G06K 15/14
See application file for complete search history.

(56) References Cited

U.S. PATENT DOCUMENTS

| 2011/0129244 | A1* | 6/2011 | Shoji | G03G 15/161 399/51 |
| 2014/0139607 | A1  | 5/2014 | Hayashi et al. | |
| 2015/0261121 | A1* | 9/2015 | Kawanabe | G03G 15/043 347/118 |
| 2016/0109822 | A1  | 4/2016 | Kohri et al. | |
| 2016/0274481 | A1* | 9/2016 | Kawanabe | G03G 21/08 |

FOREIGN PATENT DOCUMENTS

| JP | 2012-124680 | 6/2012 |
| JP | 2015-030128 | 2/2015 |

* cited by examiner

*Primary Examiner* — Carla J Therrien
(74) *Attorney, Agent, or Firm* — Amin, Turocy & Watson, LLP

(57) ABSTRACT

According to one embodiment, a driving apparatus includes a generating unit and a control unit. The generating unit respectively generates a plurality of pieces of driving data for causing each of a plurality of exposure heads to emit light for forming a plurality of element images. The control unit causes light emission start timings of the plurality of exposure heads based upon each of the plurality of pieces of driving data generated by the generating unit to be different between at least one of the exposure heads and other exposure heads.

9 Claims, 6 Drawing Sheets

DRIVING APPARATUS AND IMAGE FORMING APPARATUS

FIELD

Embodiments described herein relate generally to a driving apparatus and an image forming apparatus.

BACKGROUND

A tandem electrophotographic image forming apparatus forms a color image by causing element images of respective different colors formed by a plurality of image forming units to overlap each other. Therefore, the plurality of image forming units simultaneously execute an operation for forming the element images.

Each of the plurality of image forming units includes an exposure head configured by arranging a large number of light emitting elements such as an organic light emitting diode (OLED) over a length corresponding to one line. That is, the exposure head can perform exposure for one line by driving once. The exposure head is repeatedly driven the same number of times as the number of lines of one page, such that the exposure for one page is performed.

A timing of starting and ending the driving of the exposure head is determined in synchronization with a control clock. In a related art, the same control clock is used for driving a plurality of exposure heads. Therefore, light emission start timings of the plurality of exposure heads coincide with each other, radiation noise increases, and it may be required to strengthen an electromagnetic interface (EMI) countermeasure.

Under the above-described circumstances, it is desired to reduce the radiation noise related to driving of the exposure head.

DETAILED DESCRIPTION

In general, according to one embodiment, a driving apparatus includes a generating unit and a control unit. The generating unit respectively generates a plurality of pieces of driving data for causing each of a plurality of exposure heads to emit light for forming a plurality of element images. The control unit causes light emission start timings of the plurality of exposure heads based upon each of the plurality of pieces of driving data generated by the generating unit to be different between at least one of the exposure heads and other exposure heads.

Hereinafter, an example of an embodiment will be described with reference to the drawings. In the embodiment, a multi-function peripheral (MFP) including an image forming apparatus as a printer will be described as an example.

Figure 1:
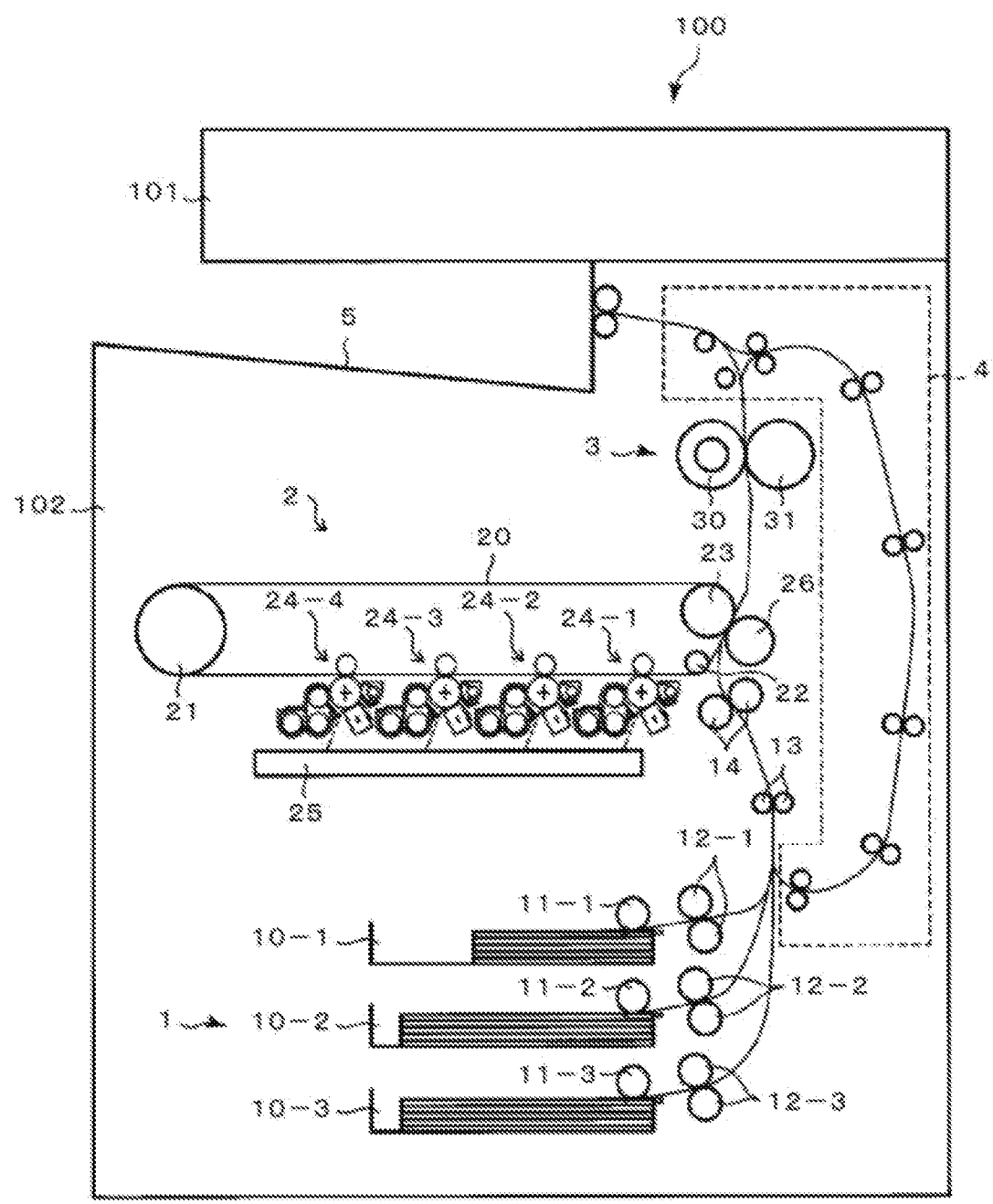
FIG. 1 is a diagram schematically illustrating a mechanical configuration of an MFP according to an embodiment.

FIG. 1 is a diagram schematically illustrating a mechanical configuration of an MFP 100 according to the embodiment.

As illustrated in FIG. 1, the MFP 100 includes a scanner 101 and a printer 102.

The scanner 101 reads an image of an original document and generates image data corresponding to the image thereof. The scanner 101 uses, for example, an image sensor such as a charge-coupled device (CCD) line sensor, and generates the image data according to a reflected light image from a reading surface of the original document. The scanner 101 scans the original document placed on an original document table by using the image sensor that moves along the original document. Alternatively, the scanner 101 scans an original document conveyed by an auto document feeder (ADF) with a fixed image sensor.

The printer 102 forms an image on a medium serving as an image forming target by an electrophotographic method. The medium is typically print paper such as cut paper. Therefore, in the following description, it is assumed that the print paper is used as the medium. However, as the medium, a sheet material made of paper other than the cut paper may be used, or a sheet material made of a material other than paper such as resin may be used. The printer 102 has a color printing function of printing a color image on the print paper and a monochrome printing function of printing a monochrome image on the print paper. For example, the printer 102 forms the color image by overlapping and forming element images respectively using three color developer including yellow, cyan, and magenta, or four color developer obtained by adding black to the three color developer. The printer 102 forms the monochrome image by using, for example, a black developer.

In a configuration example illustrated in FIG. 1, the printer 102 includes a paper feeding unit 1, a print engine 2, a fixing unit 3, an automatic double-sided unit (ADU) 4, and a paper discharging tray 5.

The paper feeding unit 1 includes paper feeding cassettes 10-1, 10-2, and 10-3, pickup rollers 11-1, 11-2, and 11-3, conveying rollers 12-1, 12-2, and 12-3, a conveying roller 13, and a registration roller 14.

The paper feeding cassettes 10-1, 10-2, and 10-3 store the print paper in a stacked state. The print paper stored in each of the paper feeding cassettes 10-1, 10-2, and 10-3 may be another type of print paper whose size and material are different, or may be the same type of print paper. The paper feeding unit 1 may also include a manual feeding tray.

The pickup rollers 11-1, 11-2, and 11-3 pick up the pieces of print paper one by one from each of the paper feeding cassettes 10,-1, 10-2, and 10-3. The pickup rollers 11-1, 11-2, and 11-3 feed the print paper picked up therefrom to the conveying rollers 12-1, 12-2, and 12-3.

The conveying rollers 12-1, 12-2, and 12-3 convey the print paper fed from the pickup rollers 11-1, 11-2, and 11-3 to the conveying roller 13 via a conveyance path formed by a guide member which is not illustrated.

The conveying roller 13 further conveys the print paper fed from any one of the conveying rollers 12-1, 12-2, and 12-3, and feeds the print paper to the registration roller 14.

The registration roller 14 corrects an inclination of the print paper. The registration roller 14 adjusts a timing of feeding the print paper to the print engine 2.

The paper feeding cassette, the pickup roller, and the conveying roller are not limited to three sets, and any number of sets may be provided. When the manual feeding tray is provided, it may not be required to provide one or more set of the paper feeding cassette, and the pickup roller and the conveying roller that are paired therewith.

The print engine 2 includes a belt 20, support rollers 21, 22, and 23, image forming units 24-1, 24-2, 24-3, and 24-4, an exposure unit 25, and a transfer roller 26.

The belt 20 has an endless shape and is supported by the support rollers 21, 22, and 23 to maintain a state illustrated in FIG. 1. The belt 20 rotates counterclockwise in FIG. 1 as the support roller 21 rotates. The belt 20 temporarily carries an image to be formed on the print paper.

The image forming units 24-1, 24-2, 24-3, and 24-4 respectively include a photosensitive drum, a charger, a developing device, a transfer roller, and a cleaner, and have a well-known structure for forming an image by the electrophotographic method in cooperation with the exposure unit 25. The image forming units 24-1, 24-2, 24-3, and 24-4 are arranged along the belt 20 in a state where axial directions of the respective photosensitive drums are parallel to each other. The image forming units 24-1, 24-2, 24-3, and 24-4 have the same structure and operation except that colors of the developers to be used are different. The image forming unit 24-1 forms an element image by using, for example, a black developer. The image forming unit 24-2 forms an element image by using, for example, a magenta developer. The image forming unit 24-3 forms an element image by using, for example, a cyan developer. The image forming unit 24-4 forms an element image by using, for example, a yellow developer. The image forming units 24-1, 24-2, 24-3, and 24-4 cause the element images of respective colors to overlap each other on the belt 20. Accordingly, the image forming units 24-1, 24-2, 24-3, and 24-4 form a color image in which the respective element images of the respective colors overlap each other on the belt at the time when the respective element images thereof pass through the image forming unit 24-1. It is also possible to form a monochrome image using only black by operating only the image forming unit 24-1.

The exposure unit 25 exposes the respective photosensitive drums of the image forming units 24-1, 24-2, 24-3, and 24-4 according to the element images of the respective colors.

The transfer roller 26 is disposed in parallel to the support roller 23, and the belt 20 is sandwiched between the transfer roller 26 and the support roller 23. The print paper fed from the registration roller 14 is sandwiched between the transfer roller 26 and the belt 20. Next, the transfer roller 26 transfers the image formed on the belt 20 to the print paper by using electrostatic force.

Thus, the print engine 2 forms the image on the print paper fed from the registration rollers 14 by the electrophotographic method.

The fixing unit 3 includes a fixing roller 30 and a pressure roller 31.

The fixing roller 30 houses a heater inside a hollow roller made of, for example, heat-resistant resin. The heater is, for example, an induction heating (IH) heater, but any other types of heaters can be appropriately used. The fixing roller 30 fixes the developer on the print paper by melting the developer adhering to the print paper fed from the print engine 2.

The pressure roller 31 is provided in parallel to the fixing roller 30 and provided in a state of being pressed against the fixing roller 30. The pressure roller 31 sandwiches the print paper fed from the print engine 2 between the pressure roller 31 and the fixing roller 30, and presses the print paper against the fixing roller 30.

The ADU 4 includes a plurality of rollers and selectively performs the following two operations. In a first operation, the print paper that passes through the fixing unit 3 is fed to the paper discharging tray 5 as it is. The first operation is performed when single-sided printing or double-sided printing is completed. In a second operation, the print paper that passes through the fixing unit 3 is once conveyed to the side of the paper discharging tray 5, and then switched back to be fed to the print engine 2. The second operation is performed when the image formation on only one side in the double-sided printing is completed.

The paper discharging tray 5 receives the print paper on which the image is formed and which is discharged.

Figure 2:
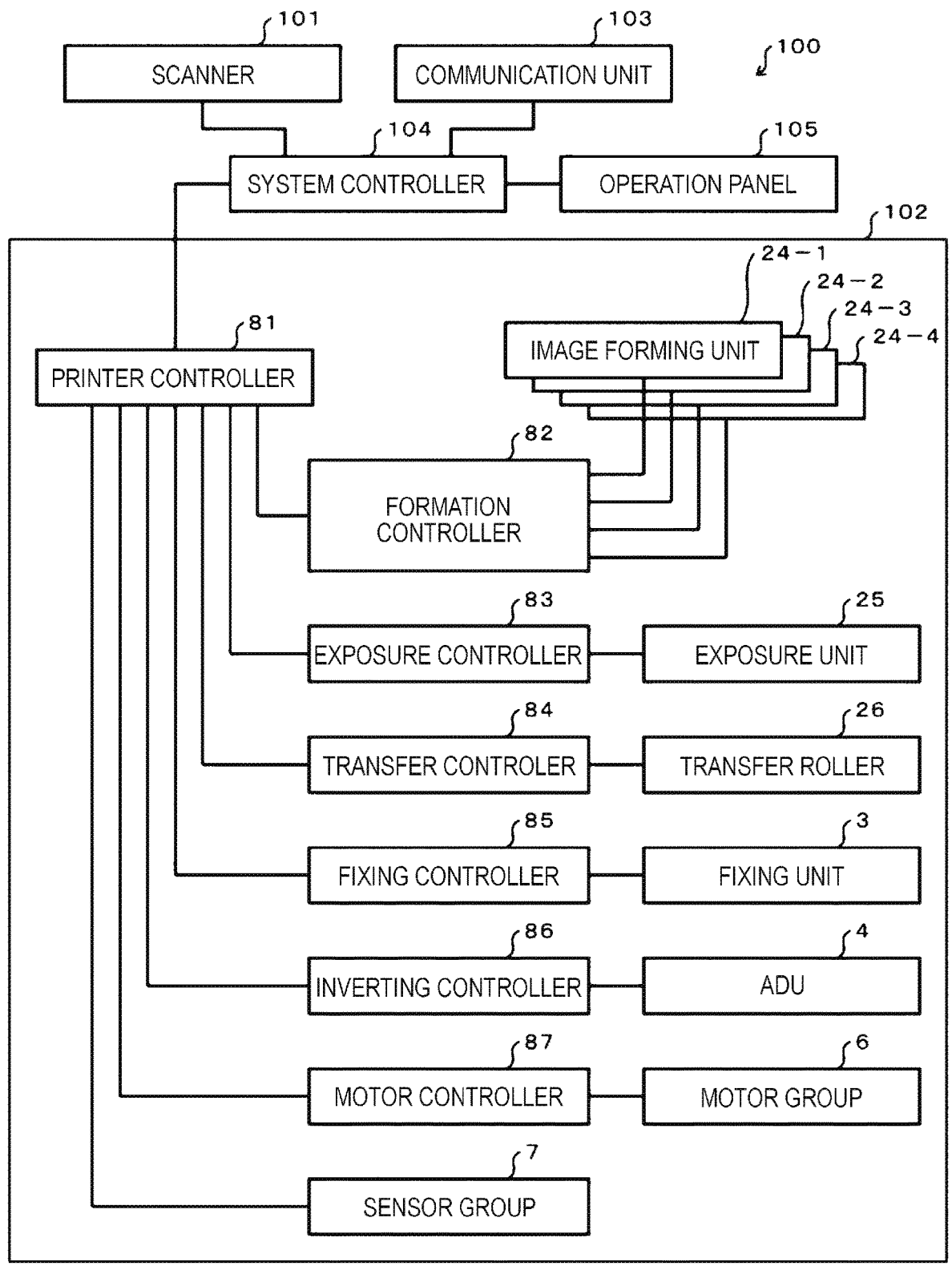
FIG. 2 is a block diagram schematically illustrating a configuration related to control of the MFP illustrated in FIG. 1.

FIG. 2 is a block diagram schematically illustrating a configuration related to control of the MFP 100. In FIG. 2, the same elements as those illustrated in FIG. 1 will be denoted by the same reference signs, and the detailed description thereof will be omitted.

The MFP 100 includes a communication unit 103, a system controller 104, and an operation panel 105 in addition to the scanner 101 and the printer 102.

The communication unit 103 performs processing for communicating with an information terminal such as a computer apparatus and an image terminal such as a facsimile apparatus via a communication network such as a local area network (LAN) and a public communication network.

The system controller 104 comprehensively controls respective units that form the MFP 100 in order to realize a desired operation of the MFP 100. The desired operation of the MFP 100 is, for example, an operation for realizing various functions realized by an existing MFP.

The operation panel 105 includes an input device and a display device. The operation panel 105 inputs an instruction from an operator by using an input device. The operation panel 105 displays various kinds of information to be notified to the operator by using the display device. For example, a touch panel can be used as the operation panel 105.

The fixing unit 3, the ADU 4, the image forming units 24-1, 24-2, 24-3, and 24-4, the exposure unit 25, and the transfer roller 26 that are provided in the printer 102 are elements to be controlled. In addition thereto, the printer 102 includes a motor group 6 as an element to be controlled. The motor group 6 includes a plurality of motors for rotating the pickup rollers 11-1, 11-2, and 11-3, the conveying rollers 12-1, 12-2, and 12-3, the conveying roller 13, the registration roller 14, the support roller 21, the transfer roller 26, the fixing roller 30, and further the roller provided in the ADU 4.

The printer 102 further includes a sensor group 7, a printer controller 81, a formation controller 82, an exposure controller 83, a transfer controller 84, a fixing controller 85, an inverting controller 86, and a motor controller 87.

The sensor group 7 includes various sensors for monitoring an operating state of the apparatus.

Under the control of the system controller 104, the printer controller 81 comprehensively controls respective units that form the printer 102 in order to realize a desired operation of the printer 102.

All of the formation controller 82, the exposure controller 83, the transfer controller 84, the fixing controller 85, the inverting controller 86, and the motor controller 87 are operated under the control of the printer controller 81, and respectively control the operations of the image forming units 24-1 to 24-4, the exposure unit 25, the transfer roller 26, the ADU 4, and the motor group 6.

Figure 3:
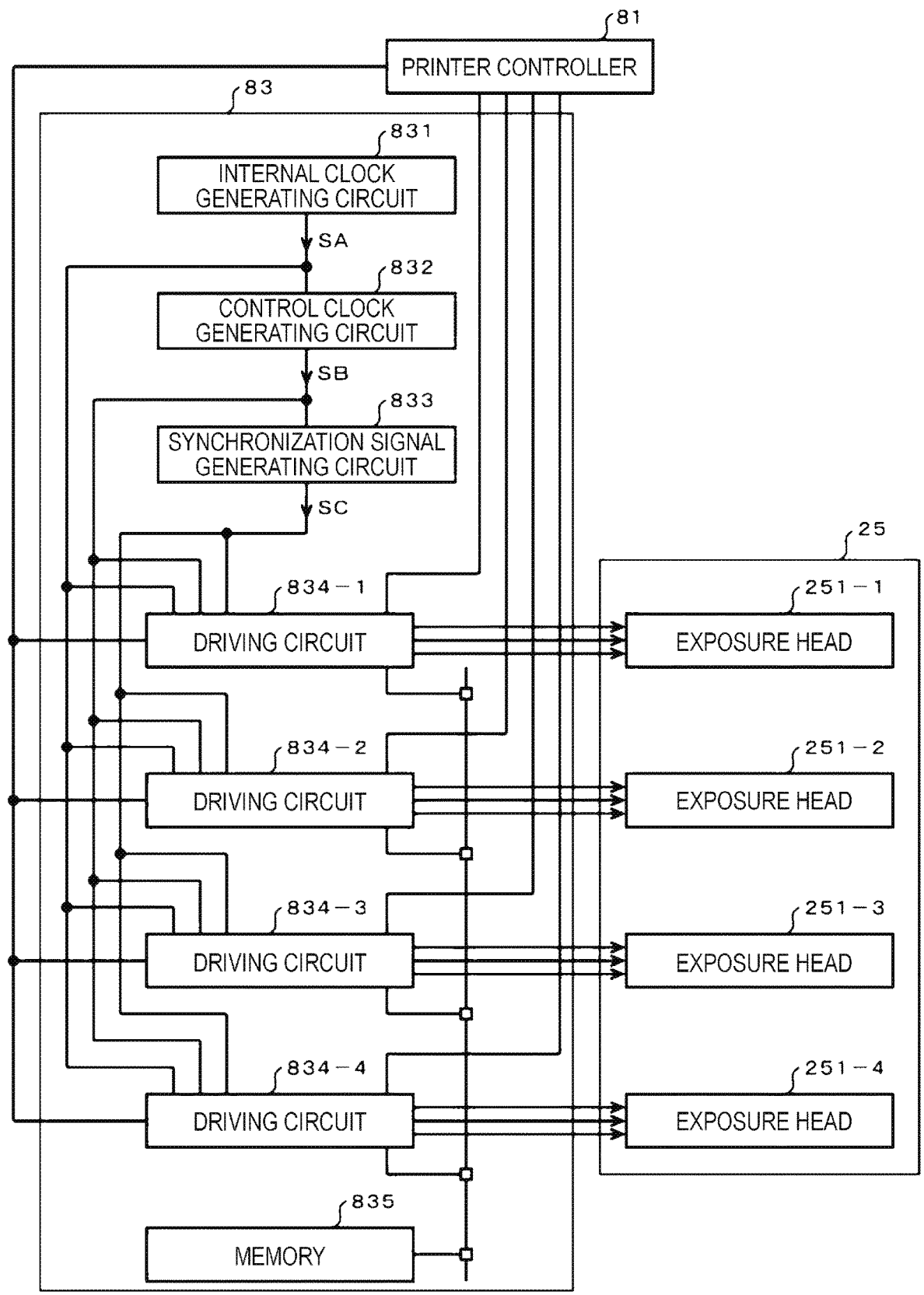
FIG. 3 is a block diagram illustrating a main circuit configuration of an exposure unit and an exposure controller illustrated in FIG. 2.

FIG. 3 is a block diagram illustrating a main circuit configuration of the exposure unit 25 and the exposure controller 83.

The exposure unit 25 includes four exposure heads 251-1, 251-2, 251-3, and 251-4. These exposure heads 251-1 to 251-4 respectively correspond to the image forming units 24-1 to 24-4. The exposure heads 251-1 to 251-4 emit exposure light to the corresponding image forming units 24-1 to 24-4.

The exposure controller 83 includes an internal clock generating circuit 831, a control clock generating circuit 832, a synchronization signal generating circuit 833, driving circuits 834-1, 834-2, 834-3, and 834-4, and a memory 835. The internal clock generating circuit 831, the control clock generating circuit 832, the synchronization signal generating circuit 833, and the driving circuits 834-1, 834-2, 834-3, and 834-4 are realized as, for example, an internal circuit of an application-specific integrated circuit (ASIC).

The internal clock generating circuit 831 generates an internal clock SA serving as a reference of an operation timing of the driving circuits 834-1 to 834-4. The internal clock SA is, for example, a square wave of 120 MHz.

The control clock generating circuit 832 generates a control clock SB based upon the internal clock SA. The control clock SB is, for example, a square wave of 20 MHz. The control clock generating circuit 832 generates the control clock SB by, for example, frequency-dividing the internal clock SA by 6. The control clock SB is a clock signal for counting a light emission period.

The synchronization signal generating circuit 833 generates a synchronization signal SC based upon the control clock SB. The synchronization signal SC is a signal indicating a timing of starting light emission for exposure of one line. For example, the synchronization signal generating circuit 833 generates the synchronization signal SC as a signal which becomes a low level only for a period of 2 cycles of the synchronization signal SC from the falling of the synchronization signal SC at a cycle of starting exposure for one line.

The driving circuits 834-1 to 834-4 respectively correspond to the exposure heads 251-1 to 251-4. The driving circuits 834-1 to 834-4 generate the driving data for driving the corresponding exposure heads 251-1 to 251-4 from image data given from the printer controller 81. The driving circuits 834-1 to 834-4 output the generated driving data to the corresponding exposure heads 251-1 to 251-4 together with the control clock and the synchronization signal which will be described later.

The memory 835 temporarily stores data for data processing for the driving circuits 834-1 to 834-4 to generate the driving data. The memory 835 is connected to the driving circuits 834-1 to 834-4 by, for example, a peripheral component interconnect (PCI) bus.

The exposure heads 251-1 to 251-4 and the driving circuits 834-1 to 834-4 are used only for forming the element images of different colors, and have the same configuration. Therefore, in the following, when it is not necessary to particularly distinguish the respective exposure heads 251-1 to 251-4 or the respective driving circuits 834-1 to 834-4, the exposure heads 251-1 to 251-4 and the driving circuit 834-1 to 834-4 will be referred to as an exposure head 251 and a driving circuit 834.

Figure 4:
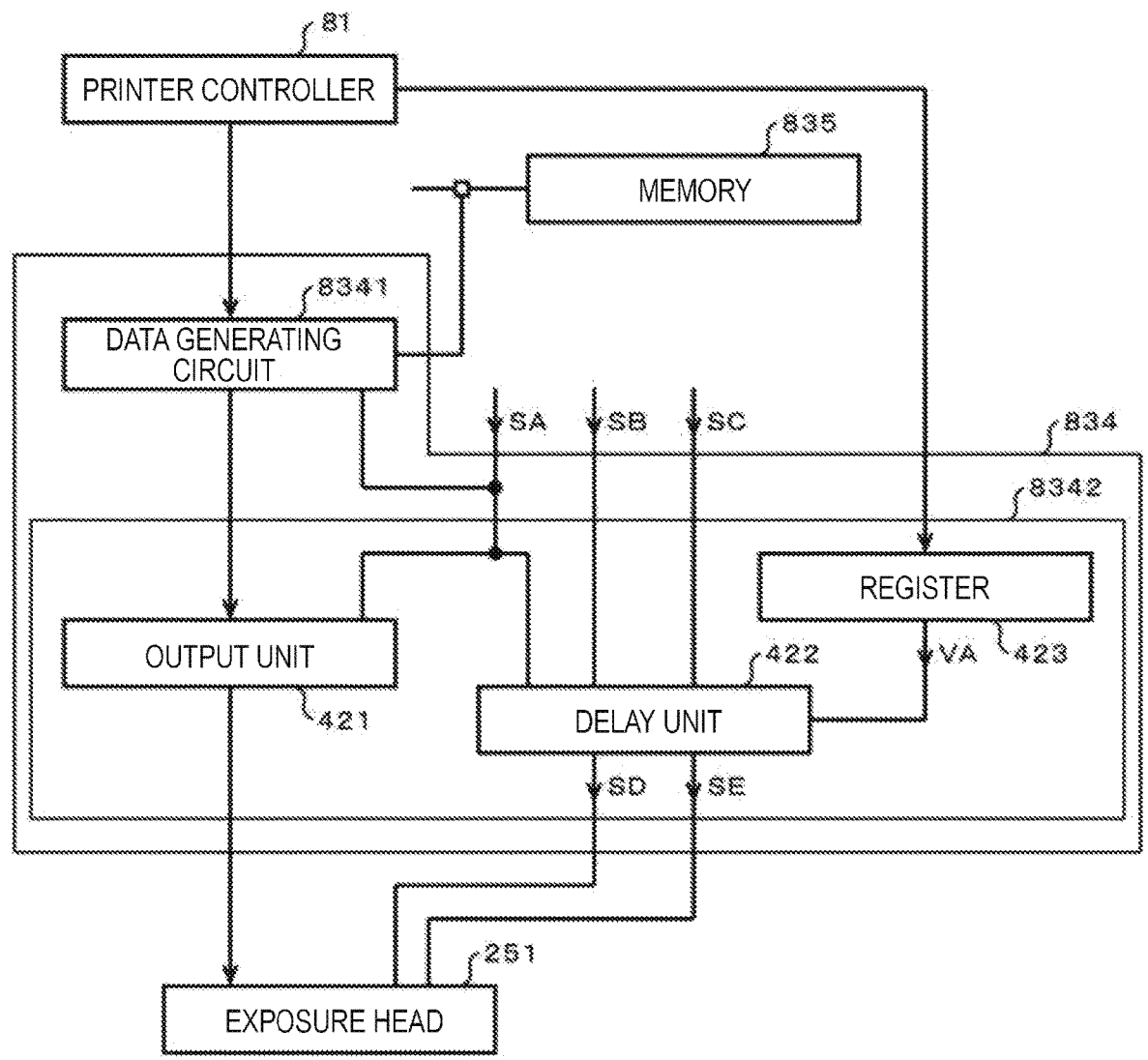
FIG. 4 is a block diagram illustrating a partial circuit configuration of a driving circuit illustrated in FIG. 3.

FIG. 4 is a block diagram illustrating a circuit configuration of a part of the driving circuit 834.

The driving circuit 834 includes a data generating circuit 8341 and an interface circuit 8342.

The data generating circuit 8341 executes various data processing for generating the driving data based upon the image data.

The interface circuit 8342 includes an output unit 421, a delay unit 422, and a register 423.

The output unit 421 outputs the driving data generated by the data generating circuit 8341 together with a transfer clock in a state of meeting an input specification of the exposure head 251.

The delay unit 422 delays the control clock SB and the synchronization signal SC outputted from the control clock generating circuit 832 and the synchronization signal generating circuit 833, and generates a control clock SD and a synchronization signal SE to be supplied to the exposure head 251.

The register 423 stores a set value VA according to a delay amount in the delay unit 422.

Figure 5:
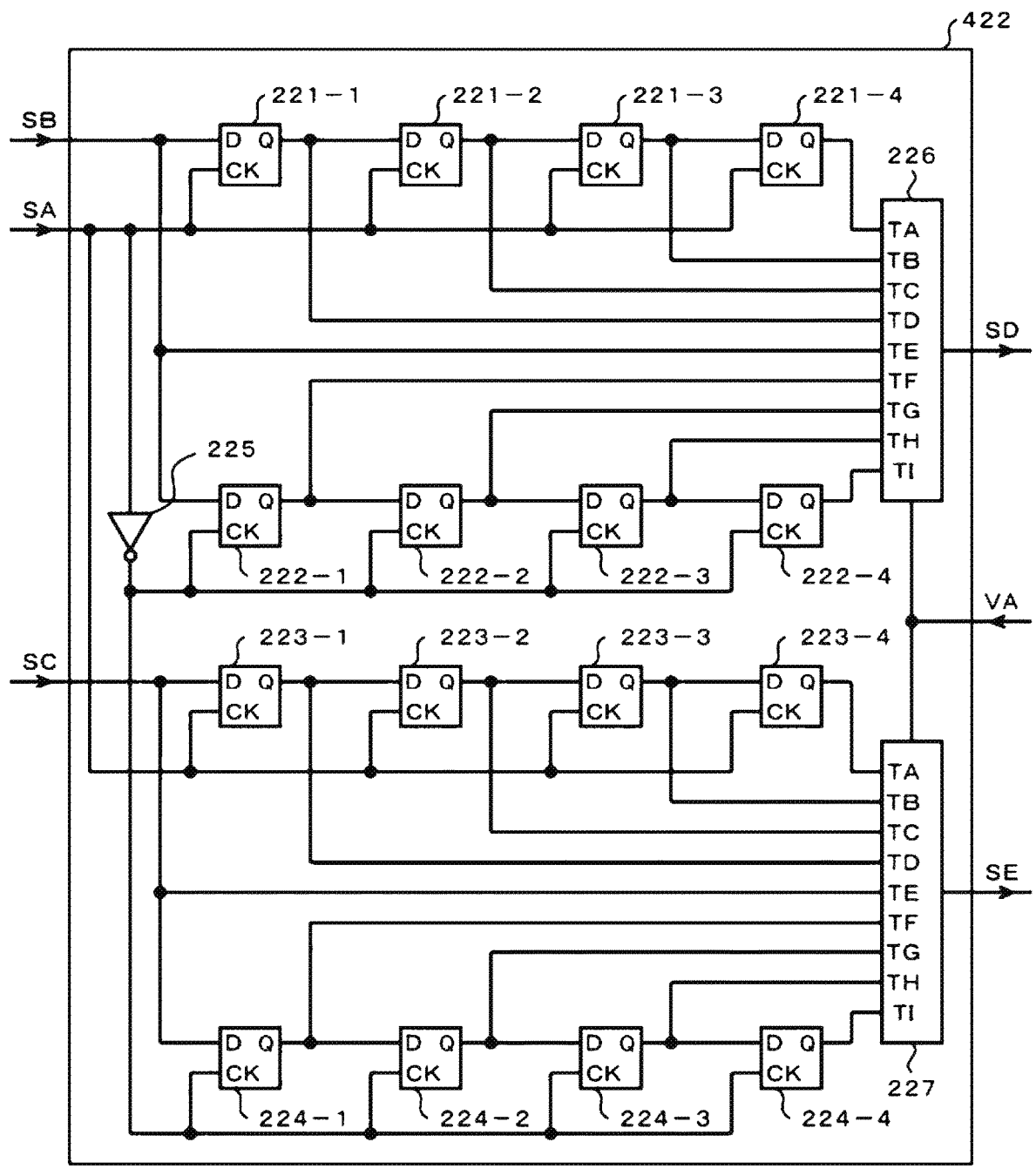
FIG. 5 is a block diagram illustrating a circuit configuration of a delay unit illustrated in FIG. 4.

FIG. 5 is a block diagram illustrating a circuit configuration of the delay unit 422.

The delay unit 422 includes D-type flip-flops 221-1, 221-2, 221-3, 221-4, 222-1, 222-2, 222-3, 222-4, 223-1, 223-2, 223-3, 223-4, 224-1, 224-2, 224-3, and 224-4, an inverting circuit 225, and selectors 226 and 227.

The flip-flops 221-1 to 221-4 are cascade-connected in the order of the flip-flop 221-1, the flip-flop 221-2, the flip-flop 221-3, and the flip-flop 221-4, and form a four-stage delay circuit. The control clock SB is inputted to a terminal of the flip-flop 221-1. The internal clock SA is supplied to the flip-flops 221-1 to 221-4 as a clock signal. An output terminal of the flip-flop 221-4 is connected to a terminal TA of the selector 226. An output terminal of the flip-flop 221-3 is connected to a terminal TB of the selector 226. An output terminal of the flip-flop 221-2 is connected to a terminal TC of the selector 226. An output terminal of the flip-flop 221-1 is connected to a terminal TD of the selector 226.

The flip-flops 222-1 to 222-4 form a four-stage delay circuit in the same manner as that of the flip-flops 221-1 to 221-4. The control clock SB is inputted to a terminal of the flip-flop 222-1. A signal obtained by inverting the internal clock SA by the inverting circuit 225 is supplied to the flip-flops 222-1 to 222-4 as a clock signal. An output terminal of the flip-flop 222-1 is connected to a terminal TF of the selector 226. An output terminal of the flip-flop 222-2 is connected to a terminal TG of the selector 226. An output terminal of the flip-flop 222-3 is connected to a terminal TH of the selector 226. An output terminal of the flip-flop 222-4 is connected to a terminal TI of the selector 226.

The control clock SB is directly inputted to a terminal TE of the selector 226.

The flip-flops 223-1 to 223-4 form a four-stage delay circuit in the same manner as that of the flip-flops 221-1 to 221-4. The synchronization signal SC is inputted to a terminal of the flip-flop 223-1. The internal clock SA is supplied to the flip-flops 223-1 to 223-4 as a clock signal. An output terminal of the flip-flop 223-4 is connected to a terminal TA of the selector 227. An output terminal of the flip-flop 223-3 is connected to a terminal TB of the selector 227. An output terminal of the flip-flop 223-2 is connected to a terminal TC of the selector 227. An output terminal of the flip-flop 223-1 is connected to a terminal TD of the selector 227.

The flip-flops 224-1 to 224-4 form a four-stage delay circuit in the same manner as that of the flip-flops 221-1 to 221-4. The synchronization signal SC is inputted to a terminal of the flip-flop 224-1. The signal obtained by inverting the internal clock SA by the inverting circuit 225 is supplied to the flip-flops 224-1 to 224-4 as a clock signal. An output terminal of the flip-flop 224-1 is connected to a terminal TF of the selector 227. An output terminal of the flip-flop 224-2 is connected to a terminal TG of the selector 227. An output terminal of the flip-flop 224-3 is connected to a terminal TH of the selector 227. An output terminal of the flip-flop 224-4 is connected to a terminal TI of the selector 227.

The synchronization signal SC is directly inputted to a terminal TE of the selector 227.

The selector 226 selects any one of the terminals TA to TI according to the set value VA stored in the register 423, and outputs a signal to be inputted to the selected terminal as the control clock SD. The selector 227 selects any one of the terminals TA to TI according to the set value VA stored in the register 423, and outputs a signal to be inputted to the selected terminal as the synchronization signal SE. In the embodiment, the selectors 226 and 227 select the terminal TA when the set value VA is "0". A selection target of the selectors 226 and 227 changes to the terminal TB, the terminal TC, and the like each time the set value increases by one. The selectors 226 and 227 select the terminal TI when the set value is "8".

Next, an operation of the MFP 100 configured as described above will be described. In the following, an operation different from an operation of another existing MFP will be mainly described, and description of other operations will be omitted. In the operation of the MFP 100, since an operation related to the driving of the exposure head 251 is different from the operation of another existing MFP, the operation will be described in detail below.

When the image data are given from the printer controller 81 to the driving circuits 834-1 to 834-4, the data generating circuits 8341 of the driving circuits 834-1 to 834-4 generate the driving data for exposure according to the element images related to respective corresponding colors. Here, the data generating circuit 8341 generates the driving data by performing processing for compensating for a shift of the element image caused by a relative inclination occurring due to a mounting error of the image forming units 24-1 to 24-4, or by performing well-known processing such as resolution conversion.

The driving data generated by each data generating circuit 8341 are supplied to the corresponding exposure heads 251-1 to 251-4. Here, the driving circuits 834-1 to 834-4 provide the control clock SD and the synchronization signal SE respectively generated by the delay units 422 respectively provided in the driving circuits 834-1 to 834-4 to the exposure heads 251-1 to 251-4.

The exposure heads 251-1 to 251-4 fetch the synchronization signal SE outputted from the corresponding driving circuits 834-1 to 834-4 at a second falling timing of the control clock SD after the synchronization signal SE becomes Low level. Every time the exposure heads 251-1 to 251-4 fetch the driving data outputted from the corresponding driving circuits 834-1 to 834-4 by one line, the exposure heads 251-1 to 251-4 start light emission according to the driving data for the one line based upon a rising phase of the control clock SD after the synchronization signal SE is fetched as described above.

The set value is individually set in the register 423 provided in each of the driving circuits 834-1 to 834-4. The set value is determined by, for example, a designer of the MFP 100, and is written to each register 423 by the printer controller 81 under an instruction by an operator during a manufacturing process. The set value may be also determined by a person other than the designer. The writing of the set value to each register 423 may be also performed at any timing outside the manufacturing process. In the embodiment, the set value stored in the register 423 provided in the driving circuit 834-1 is set to "4". The set value stored in the register 423 provided in the driving circuit 834-2 is set to "3". The set value stored in the register 423 provided in the driving circuit 834-3 is set to "2". The set value stored in the register 423 provided in the driving circuit 834-4 is set to "8".

In the delay circuit formed of the flip-flops 221-1 to 221-4, the control clock SB receives a delay of one cycle, 2 cycles, 3 cycles, and 4 cycles of the internal clock SA. As a result, the synchronization signals respectively inputted to the terminals TA, TB, TC, and TD of the selector 226 are respectively delayed by 4 cycles, 3 cycles, 2 cycles, and one cycle with respect to the control clock SB inputted to the terminal TE.

In the delay circuit formed of the flip-flops 222-1 to 222-4, the control clock SB receives a delay of 0.5 cycle, 1.5 cycles, 2.5 cycles, and 3.5 cycles of the internal clock SA. As a result, the synchronization signals respectively inputted to the terminals TF, TG, TH, and TI of the selector 226 are respectively delayed by 0.5 cycle, 1.5 cycles, 2.5 cycles, and 3.5 cycles with respect to the control clock SB inputted to the terminal TE.

In the delay circuit formed of the flip-flops 223-1 to 223-4, the synchronization signal SC receives a delay of one cycle, 2 cycles, 3 cycles, and 4 cycles of the internal clock SA. As a result, the synchronization signals respectively inputted to the terminals TA, TB, TC, and TD of the selector 227 are respectively delayed by 4 cycles, 3 cycles, 2 cycles, and one cycle with respect to the synchronization signal SC inputted to the terminal TE.

In the delay circuit formed of the flip-flops 224-1 to 224-4, the synchronization signal SC receives a delay of 0.5 cycle, 1.5 cycles, 2.5 cycles, and 3.5 cycles of the internal clock SA. As a result, the synchronization signals respectively inputted to the terminals TF, TG, TH, and TI of the selector 227 are respectively delayed by 0.5 cycle, 1.5 cycles, 2.5 cycles, and 3.5 cycles with respect to the synchronization signal SC inputted to the terminal TE.

Since the set value stored in the register 423 of the driving circuit 834-1 is "4", the selectors 226 and 227 in the driving circuit 834-1 select the terminal TE. Therefore, the driving circuit 834-1 outputs the control clock SB and the synchronization signal SC as they are to the exposure head 251-1 as the control clock SD and the synchronization signal SE.

Since the set value stored in the register 423 of the driving circuit 834-2 is "3", the selectors 226 and 227 in the driving circuit 834-2 select the terminal TD. Therefore, the driving circuit 834-2 outputs the control clock SD and the synchronization signal SE, which receive the delay of one cycle of the internal clock SA with respect to the control clock SB and the synchronization signal SC, to the exposure head 251-2.

Since the set value stored in the register 423 of the driving circuit 834-3 is "2", the selectors 226 and 227 in the driving circuit 834-3 select the terminal TC. Therefore, the driving circuit 834-3 outputs the control clock SD and the synchronization signal SE, which receive the delay of 2 cycles of the internal clock SA with respect to the control clock SB and the synchronization signal SC, to the exposure head 251-3.

Since the set value stored in the register 423 of the driving circuit 834-4 is "8", the selectors 226 and 227 in the driving circuit 834-4 select the terminal TI. Therefore, the driving circuit 834-4 outputs the control clock SD and the synchronization signal SE, which receive the delay of 3.5 cycles of the internal clock SA with respect to the control clock SB and the synchronization signal SC, to the exposure head 251-4.

Figure 6:
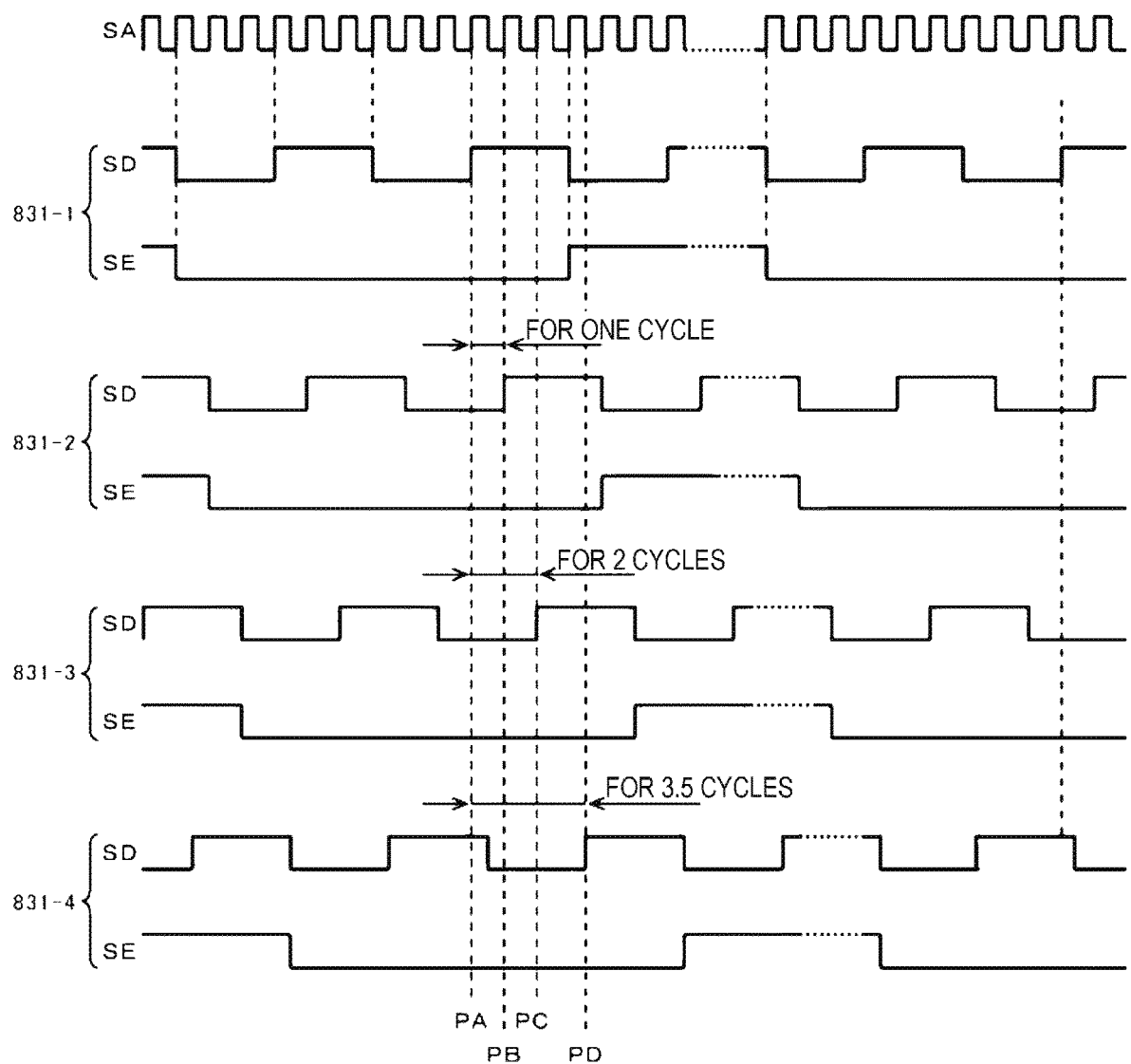
FIG. 6 is a timing diagram of a synchronization signal and a control clock.

FIG. 6 is a timing diagram of the control clock SD and the synchronization signal SE as described above.

As illustrated in FIG. 6, change timings of all the control clocks SD respectively outputted from the driving circuits 834-1 to 834-4 do not coincide with each other. Change timings of all the synchronization signals SE respectively outputted from the driving circuits 834-1 to 834-4 do not coincide with each other. Respective light emission start timings of the exposure heads 251-1 to 251-4 based upon the control clocks SD and the synchronization signals SE become time points PA, PB, PC, and PD, which are different from each other.

Thus, according to the MFP 100, it is possible to shift the respective light emission start timings of the exposure heads 251-1 to 251-4. As a result, a maximum value of an instantaneous fluctuation width of a current amount for driving the exposure heads 251-1 to 251-4 can be reduced compared to a case where the light emission start timings of the exposure heads 251-1 to 251-4 coincide with each other. Accordingly, radiation noise caused by a fluctuation in the current for driving the exposure heads 251-1 to 251-4 is reduced, thereby easily performing an EMI countermeasure.

A peak value of the current for driving the exposure heads 251-1 to 251-4 becomes smaller, such that a peak current value required from a power supply for supplying the driving current to the exposure heads 251-1 to 251-4 is reduced. As a result, required specifications for components that form the power supply are relaxed, and thus cost reduction can be expected.

Here, since a phase of the control clock SD of each color is shifted, an identification timing of the synchronization signal of each color is also shifted. However, for example, when a process speed is 250 mm/s and a pixel density is 2400 dpi, one line cycle is 42.3 μS, whereas a shift width between the control clock SD and the synchronization signal is 29.17 ns for 3.5 cycles of the internal clock SA to the maximum, and is within 50 ns for one cycle of the control clock. An influence on a write position in a sub-scanning direction due to the shift of this degree is a level that can be ignored.

In the above-described embodiment, the delay amount is set so that all the light emission start timings of the respective exposure heads 251-1 to 251-4 do not overlap each other. Here, the peak value of the current for driving the exposure heads 251-1 to 251-4 becomes the minimum value. However, when at least one light emission start timing of the exposure heads 251-1 to 251-4 is different from other light emission start timings, the peak value of the current can be reduced compared to a related-art case in which all the light emission start timings of the exposure heads 251-1 to 251-4 coincide with each other.

It is already known that a spread spectrum clock generator (SSCG) is used as the EMI countermeasure against noise radiation caused by the clock signal. However, when the control clock is generated by the SSCG, the cycle of the control clock fluctuates such that unevenness of the image density may occur. However, according to the MFP 100, since the cycles of the respective control clocks SD are uniform, the above-mentioned problem caused by using the SSCG does not occur.

In the embodiment, various modifications can be performed as follows.

In the embodiment, four image forming units 24-1, 24-2, 24-3, and 24-4 are provided, and the number of image forming units may be two, three, or five or more.

The delay amount in each of the driving circuits 834-1 to 834-4 may be fixed. Here, the set value stored in the register 423 may not be changed, or a non-rewritable device may be used as the register 423. Alternatively, the delay unit 422 provided in each of the driving circuits 834-1 to 834-4 may be configured to delay the control clock SB and the synchronization signal SC by a predetermined delay amount.

It is also possible to be executed as an image forming apparatus specialized in an image forming function. Unlike the MFP, it is also possible to be applied to an apparatus having a function other than image formation.

The exposure controller 83, or the ASIC including the internal clock generating circuit 831, the control clock generating circuit 832, the synchronization signal generating circuit 833, and the driving circuits 834-1, 834-2, 834-3, and 834-4 can also be realized as an independent driving apparatus that can be mounted on any image forming apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A driving apparatus, comprising:
    a processor configured to:
    respectively generate a plurality of pieces of driving data for causing each of a plurality of exposure heads to emit light for forming a plurality of element images; and
    differentiate light emission start timings of the plurality of exposure heads based upon each of the plurality of pieces of driving data between at least one of the exposure heads and another exposure head,
    wherein
    the plurality of exposure heads start the light emission at a timing determined by a control clock and a synchronization signal, and wherein
    the processor is further configured to:
    generate the control clock by frequency-dividing an internal clock;
    generate the synchronization signal; and
    respectively correlate the plurality of exposure heads, and output, to the exposure heads, the control clock and the synchronization signal as they are or after delaying the control clock and the synchronization signal by a predetermined delay amount,
    wherein the predetermined delay amount is a predetermined cycles of the internal clock and the predetermined cycles of the internal clock is smaller than one cycle of the control clock.

2. The driving apparatus according to claim 1, wherein the processor is further configured to:
    determine whether to output the control clock and the synchronization signal as they are, or to delay the control clock and the synchronization signal, and determine the delay amount when the delay is performed based upon a set value individually set.

3. An image forming apparatus, comprising:
    a plurality of exposure heads;

a plurality of element image forming components configured to form a plurality of element images by using exposure by the plurality of exposure heads; and a processor configured to:

cause the plurality of element images respectively formed by the plurality of image forming component to overlap each other, and to form one image;

respectively generate a plurality of pieces of driving data for causing each of the plurality of exposure heads to emit light for forming the plurality of element images; and differentiate light emission start timings of the plurality of exposure heads based upon each of the plurality of pieces of driving data between at least one of the exposure heads and another exposure head, wherein the plurality of exposure heads start the light emission at a timing determined by a control clock and a synchronization signal, and wherein the processor is further configured to:

generate the control clock by frequency-dividing an internal clock;

generate the synchronization signal; and respectively correlate the plurality of exposure heads, and output, to the exposure heads, the control clock and the synchronization signal as they are or after delaying the control clock and the synchronization signal by a predetermined delay amount, wherein the predetermined delay amount is a predetermined cycles of the internal clock and the predetermined cycles of the internal clock is smaller than one cycle of the control clock.

4. The image forming apparatus according to claim 3, wherein the processor is further configured to:

determine whether to output the control clock and the synchronization signal as they are, or to delay the control clock and the synchronization signal, and determine the delay amount when the delay is performed based upon a set value individually set.

5. A driving method, comprising:

respectively generating a plurality of pieces of driving data for causing each of a plurality of exposure heads to emit light for forming a plurality of element images; and differentiating light emission start timings of the plurality of exposure heads based upon each of the plurality of pieces of driving data generated between at least one of the exposure heads and another exposure head, wherein the plurality of exposure heads start the light emission at a timing determined by a control clock and a synchronization signal, generating the control clock by frequency-dividing an internal clock;

generating the synchronization signal; and respectively correlating with the plurality of exposure heads, and output, to the exposure heads, the control clock and the synchronization signal as they are or after delaying the control clock and the synchronization signal by a predetermined delay amount, wherein the predetermined delay amount is a predetermined cycles of the internal clock and the predetermined cycles of the internal clock is smaller than one cycle of the control clock.

6. The driving method according to claim 5, further comprising:

determining whether to output the control clock and the synchronization signal as they are, or to delay the control clock and the synchronization signal; and determining the delay amount when the delay is performed based upon a set value individually set.

7. The driving method according to claim 5, further comprising:

forming the plurality of element images by using exposure by the plurality of exposure heads; and causing the plurality of element images respectively formed to overlap each other, and to form one image.

8. The driving method according to claim 7, wherein the plurality of exposure heads start the light emission at the timing determined by a control clock and a synchronization signal, and further comprising:

generating the control clock;

generating the synchronization signal; and respectively correlating the plurality of exposure heads, and outputting, to the exposure heads, the control clock and the synchronization signal as they are or after delaying the control clock and the synchronization signal by a predetermined delay amount.

9. The driving method according to claim 8, further comprising:

determining whether to output the control clock and the synchronization signal as they are, or to delay the control clock and the synchronization signal; and determining the delay amount when the delay is performed based upon a set value individually set.

* * * * *